(12) United States Patent
Christian

(10) Patent No.: US 8,059,905 B1
(45) Date of Patent: Nov. 15, 2011

(54) METHOD AND SYSTEM FOR THRESHOLDING

(75) Inventor: James D. Christian, Austin, TX (US)

(73) Assignee: Picture Code, Austin, TX (US)

( * ) Notice: Subject to any disclaimer, the term of this patent is extended or adjusted under 35 U.S.C. 154(b) by 783 days.

(21) Appl. No.: 11/472,174

(22) Filed: Jun. 21, 2006

Related U.S. Application Data

(60) Provisional application No. 60/692,466, filed on Jun. 21, 2005.

(51) Int. Cl.
G06K 9/40 (2006.01)

(52) U.S. Cl. .......... 382/254; 382/274; 358/463

(58) Field of Classification Search ......... 382/254, 382/260
See application file for complete search history.

(56) References Cited

U.S. PATENT DOCUMENTS

| | | | |
|---|---|---|---|
| 5,602,934 A | 2/1997 | Li | |
| 5,619,998 A * | 4/1997 | Abdel-Malek et al. | 600/437 |
| 5,771,318 A | 6/1998 | Fang et al. | |
| 6,069,982 A | 5/2000 | Reuman | |
| 6,208,951 B1 * | 3/2001 | Kumar et al. | 702/191 |
| 6,229,923 B1 | 5/2001 | Williams | |
| 6,256,403 B1 | 7/2001 | Florent et al. | |
| 6,741,739 B1 | 5/2004 | Vincent | |
| 6,847,737 B1 | 1/2005 | Kouri et al. | |
| 7,426,464 B2 * | 9/2008 | Hui et al. | 704/227 |
| 7,889,943 B1 | 2/2011 | Christian | |
| 2002/0008771 A1 | 1/2002 | Uchino | |
| 2002/0034337 A1 | 3/2002 | Shekter | |
| 2002/0041717 A1 | 4/2002 | Murata | |
| 2003/0035056 A1 | 2/2003 | Chen | |
| 2003/0079191 A1 | 4/2003 | Savithri | |
| 2003/0194150 A1 | 10/2003 | Berkner | |
| 2003/0231798 A1 | 12/2003 | Jang | |
| 2006/0029285 A1 | 2/2006 | Hein | |

FOREIGN PATENT DOCUMENTS

| | | |
|---|---|---|
| GB | 2 272 285 A | 5/1994 |
| JP | 2003101784 | 4/2003 |

OTHER PUBLICATIONS

Yaroslavsky: "Local adaptive image restoration and enhancement with the use of DFT and DCT in a running window", SPIE, 1996.*
Eom et al: "Wavelet-based denoising with nearly arbitrarily shaped windows", IEEE-SPL, 2004.*
"Change Log", obtained from the internet at <<http://web.archive.org/web/20040806131333/www.picturecode.com>>, May 12, 2009; 3 pages.
"Digital files-noise removal software-Noise Ninja", obtained from the internet at <<http://web.archive.org/web/20040819182053/photography.about.com>>, May 12, 2009; 3 pages.

(Continued)

*Primary Examiner* — Samir Ahmed
*Assistant Examiner* — Ruiping Li
(74) *Attorney, Agent, or Firm* — Sprinkle IP Law Group

(57) ABSTRACT

Embodiments of the present invention provide for thresholding data elements (such as coefficients). According to one embodiment, a number of functions (including feature detector functions) can be applied to a data element to generate responses. Additionally, noise profiles can be consulted to determine an expected result for each function if the data element represents noise. An output value (e.g., after thresholding) for the data element can be generated based on the actual responses of the functions and the expected responses.

27 Claims, 6 Drawing Sheets

OTHER PUBLICATIONS

"NEWS!—NoiseNinja 1.1 released!", obtained from <<http://web.archive.org/web/20040628013550/www.imaging-resource.com>>, May 12, 2009; 3 pages.

"Noise Ninja FAQ", obtained from the internet at <<http://web.archive.org/web/20031207091900/www.picturecode.com>>, May 12, 2009; 1 page.

"Noise Ninja FAQ", obtained from the internet at <<http://web.archive.org/web/20040607060154/www.picturecode.com>>, May 12, 2009; 1 page.

"Noise Ninja: Features, advantages, and differences", obtained from the internet at <<http://web.archive.org/web/20031108063949/www.picturecode.com, May 12, 2009; 2 pages.

"Noise Ninja: Features, advantages, and differences", obtained from the internet at <<http://web.archive.org/web/20040607081610/www.picturecode.com>>, May 12, 2009; 2 pages.

"Noise Ninja: Understanding Noise", obtained from the internet at <<http://web.archive.org/web/20031108064152/www.picturecode.com>, May 12, 2009; 2 pages.

"Noise Ninja: Understanding Noise", obtained from the internet at <<http://web.archive.org/web/20040607062207/www.picturecode.com>, May 12, 2009; 2 pages.

"Noise Reduction Tool Comparison", obtained from the internet at <<http://webarchive.org/web/20031205043059/www.michaelalmond.com>>, May 12, 2009; 2 pages.

"Noise Reduction Tool Comparison", obtained from the internet at <<http://web.archive.org/web/200312061843/www.michaelalmond.com>>, May 12, 2009; 2 pages.

"PictureCode home page", obtained from the internet at <<http://web.archive.org/web/20040615095551/http://www.picturecode.com>>, May 12, 2009; 2 pages.

"PictureCode home page", obtained from the internet at <<http://web.archive.org/web/2004040518461/http://www.picturecode.com>>, May 12, 2009; 1 page.

"PictureCode home page", obtained from the internet at <<http://web.archive.org/web/20031124210205/http://www.picturecodes.com>>, May 12, 2009; 1 page.

"PictureCode home page", obtained from the internet at <<http://web.archive.org/web/20031107051142/http://www.picturecode.com>>, May 12, 2009; 1 page.

"PictureCode: Downloads", obtained from the internet at <<http://web.archive.org/web/20031108070427/www.picturecode.com>>, May 12, 2009; 2 pages.

"PictureCode: Downloads", obtained from the internet at <<http://web.archive.org/web/20031207084954/www.picturecode.com>>, May 12, 2009; 2 pages.

"PictureCode: Downloads", obtained from the internet at <<http://web.archive.org/web/20040607051328/www.picturecode.com>>, May 12, 2009; 2 pages.

"PictureCode: Online store", obtained from the internet at <<http://web.archive.org/web/20031108065053/www.picturecode.com>>, May 12, 2009; 1 page.

"PictureCode: Online store", obtained from the internet at <<http://web.archive.org/web/20040607063645/www.picturecode.com>>, May 12, 2009; 1 page.

"PictureCode: Reviews and testimonials", obtained from the internet at <<http://web.archive.org/web/20031118172841/www.picturecode.com>>, May 12, 2009; 1 page.

"PictureCode: Reviews and testimonials", obtained from the internet at <<http://web.archive.org/web/20040214001632/www.picturecode.com>>, May 12, 2009; 1 page.

"PictureCode: Reviews and testimonials", obtained from the internet at <<http://web.archive.org/web/20040622021409/www.picturecode.com>>, May 12, 2009; 1 page.

"Rob Galbraith DPI: Noise Ninja v2.0 for Mac and . . . ", obtained from the Internet at <<http://web.archive.org/web/20040614144304/www.robgalbraith.com>>, May 12, 2009; 4 pages.

"Rob Galbraith DPI: Noise Ninja v2.0 for Mac and . . . ", obtained from the internet at <<http://web.archive.org/web/20040924080759/www.robgalbraith.com>>, May 12, 2009; 4 pages.

"PictureCode: Update log for downloads", obtained from the internet at <<http://www.picturecode.com/update_log.htm>>, May 12, 2009; 2 pages.

"PictureCode: Update log for downloads", obtained from the internet at <<http://www.web.archive.org/web/20031118192520/www.picturecode.com>>, May 12, 2009; 1 page.

"PictureCode: Update log for downloads", obtained from the Internet at <<http://web.archive.org/web/20040605211236/www.picturecode.com>>, May 12, 2009; 2 pages.

"Workflow Technique #025 @Digital Outback Photo", obtained from the internet at <<http://web.archive.org/web/20031119051008/www.outbackphoto.com>>, May 12, 2009; 11 pages.

"Main Page" from Picturecode, 24 pages, obtained from internet <<http://picturecode.com/wiki/index.php/Main_Page>> on Feb. 2, 2009.

"PictureCode: News and events—What's happening at PictureCode" from PictureCode, 4 pages, obtained from internet <<http://picturecode.com/news/htm>> on Feb. 2, 2009.

"PictureCode: Change log for the plug-in version of Noise Ninja" from PictureCode, 3 pages, obtained from Internet <<http://picturecode.com/change_log2.htm on Feb. 2, 2009.

"PictureCode: The five-minute guide to Noise Ninja 2" from PictureCode, 5 pages, obtained from internet <<http://picturecode.com/docs/nnstandalone>> on Feb. 2, 2009.

Li and Orchard, "Spatially Adaptive Image Denoising Under Overcomplete Expansion", 2000 IEEE, Dept. of Electrical Engineering, Princeton University, pp. 300-303.

Simoncelli and Adelson, "Noise Removal via Bayesian Wavelet Coring," Proceedings of $3^{rd}$ IEEE International Conference on Image Processing. vol. 1, pp. 379-382, Sep. 16-19, 1996.

Chang, "Spatially Adaptive Wavelet Thresholding with Context Modeling for Image Denoising," IEEE Transactions on Image Processing, vol. 9:9, pp. 1522-1531, Sep. 2000.

Tomasi and Manduchi, "Bilateral Filtering for Gray and Color Images," Proceedings of the 1998 IEEE International Conference on Computer Vision, Bombay, India, 1998.

Perona and Malik, "Scale-Space and Edge Detection Using Anisotropic Diffusion," IEE Transactions on Pattern Analysis and Machine Intelligence, vol. 12:7, pp. 629-639, Jul. 1990.

Sample pages from Numerical Receipts in C: The Art of Scientific Computing, "13.10 Wavelet Transforms," pp. 591-606, 1988-1992.

Buades et al., "On Image Denoising Methods," pp. 1-40.

Donoho and Johnstone, "Ideal Spatial Adaptation by Wavelet Shrinkage," Dept. of Statistics, Stanford University, Stanford, CA, 94305-4065, U.S.A., pp. 1-40, Jun. 1992.

Donoho, "De-Noising by Soft-Thresholding," Dept. of Statistics, Stanford, University, pp. 1-37.

http://www.fmrib.ox.ac.uk/steve/susan/susan, node117.html, May 5, 1998.

Office Action for U.S. Appl. No. 11/405,797 dated Jul. 30, 2009, 36 pgs.

Office Action for U.S. Appl. No. 11/472,169, dated Jul. 17, 2009, 17 pgs.

Hsu, "Extracting Target Features from Angle-Angle and Range-Doppler Images", The Lincoln Laboratory Journal, vol. 6, No. 1, 1993, pp. 213-227.

Office Action for U.S. Appl. No. 11/472,183 mailed Nov. 4, 2009.

Linda Shapiro and George Stockman, Computer Vision, Prentice Hall, 2001.

Wikipedia, Article on Rotational Symmetry, at http://en.wikipedia.org/wiki/Rotational_symmetry, downloaded on Sep. 16, 2009, 5 pgs.

Wikipedia, Article on Reflection Symmetry, http://en.wikipedia.org/wiki/Reflection_symmetry, downloaded on Sep. 16, 2009, 2 pgs.

Office Action for U.S. Appl. No. 11/471,918 mailed Dec. 9, 2009, 7 pgs.

Abhayaratne, "2D Wavelet Transforms With a Spatially Adaptive 2D Low Pass Filter," Proceedings of the 6th Nordic Signal Processing Symposium, Jun. 9-11, 2004, Norsig 2004, 5 pgs.

Sakellaropoulos et al, "A wavelet-based spatially adaptive method for mammographic contrast enhancement," Institute of Physics Publishing, Physics in Medicine and Biology, 2003, pp. 787-803.

Office Action for U.S. Appl. No. 11/472,169 mailed Feb. 22, 2010, 16 pgs.

Office Action for U.S. Appl. No. 11/405,797 mailed Apr. 28, 2010, 25 pgs.

Notice of Allowance for U.S. Appl. No. 11/405,797, mailed Oct. 5, 2010, 8 pgs.

Supplemental Notice of Allowability for U.S. Appl. No. 11/405,797, mailed Oct. 29, 2010, 6 pgs.

* cited by examiner

METHOD AND SYSTEM FOR THRESHOLDING

RELATED APPLICATIONS

This application, under 35 U.S.C. 119(e), claims priority to and the benefit of U.S. Provisional Patent Application No. 60/692,466, entitled "Generalized Spatially Adaptive Wavelet Thresholding" by Christian, filed Jun. 21, 2005, which is hereby fully incorporated by reference herein.

TECHNICAL FIELD OF THE INVENTION

The present invention relates to thresholding. More particularly, embodiments of the present invention relate to a method and apparatus for applying thresholds to data from a digital image.

BACKGROUND

Devices like digital cameras, film scanners, x-ray machines, and radar imaging devices typically introduce noise into the resulting image. The noise can result from a variety of sources, including sampling errors, temperature-induced "dark current" noise, amplifier noise, and grain in scanned film images. The noise may appear as grain, speckles, and other artifacts. When the amount of noise is sufficiently high, it can detract significantly from the quality of the image, and so it is desirable to remove it.

With many devices, noise is not constant across the image. For instance, well-illuminated areas might have very little noise, while deep shadows may exhibit obvious noise artifacts. The relationship between noise and factors like image brightness is unique for every type of device.

Wavelet thresholding is a technique for removing noise from time-series data, images, and higher-dimensional signals, and it also has application to other areas such as compression. Typically, a wavelet transform is applied to the noisy signal, yielding a set of subbands corresponding to different frequency components of the signal. The noise coefficients in the subbands tend to have smaller magnitude than the coefficients corresponding to edges or other important features. By suppressing these small coefficients, the noise is removed, while the important features are preserved.

The idea of thresholding is not specific to wavelets. For instance, a low-pass filtered version of the original signal can be subtracted from the signal to yield a high-pass filtered version of the signal. Then thresholding can be applied to the high-pass data, and the thresholded high-pass data is added to the low-pass data to reconstruct a denoised signal.

A number of thresholding methods have been proposed in an attempt to improve the quality of thresholding results for wavelet and other noise reduction techniques, including hard thresholding, soft thresholding, sub-band adaptive thresholding, context modeling and frequency thresholding.

In hard thresholding, a coefficient is set to zero if it has absolute value less than a threshold, otherwise it is left unchanged. When used for image denoising, this approach yields undesirable visual artifacts where nearby pixels straddle the threshold value.

Some soft thresholding methods replace a coefficient x by $\max(0, \operatorname{sgn}(x) \cdot (\operatorname{abs}(x)-t))$, where t is a constant threshold value. This avoids the discontinuity in the hard thresholding function, which yields aesthetically more pleasing results for image denoising.

Hard or soft thresholding can be modified to use a different threshold value t for each subband, where each threshold value is determined by statistical analysis of each subband. In another subband-adaptive approach, Bayesian coring fits a parametric statistical model to each subband in order to exploit kurtosis or other higher-order statistics of the coefficients that can help to distinguish signal from noise. The resulting thresholding function is applied to all coefficients in the subband. That is, the function is not adaptive not within a subband.

In the context modeling approach, a generalized Gaussian distribution is assumed for the coefficients of each wavelet subband. Parameters of the distribution are fit to the coefficients, which requires a potentially time-consuming least-squares estimate of coefficients for a weighted average. The thresholding function is spatially adaptive. In other words, the behavior of the function is modified based on statistical properties of nearby coefficients. The actual threshold value for a particular coefficient is calculated based on a known mathematical relationship between the generalized Gaussian distribution and the noise variance.

The frequency thresholding approach of U.S. Pat. No. 6,741,739 appears to be, at least for conventional wavelet decompositions, algebraically similar to hard thresholding with an infinite threshold value. The method appears to reconstruct a "frequency thresholded" image from the wavelet decomposition using only the high-frequency coefficients of each wavelet level, and setting the low-pass coefficients to zero. This reconstructed image is subtracted from the original image.

Current thresholding methods suffer an additional shortcoming in that they assume that the amount of noise is either signal-independent, or dependent only on monochromatic signal levels in an image. Other methods only relate the noise level to luminance, or assume constant noise throughout a subband.

SUMMARY OF THE INVENTION

Embodiments of the present invention provide a system and method of thresholding values (e.g., coefficient values) to suppress values that more likely represent noise.

One embodiment of the present invention comprises a method for thresholding comprising selecting a data element having a corresponding data element value in a set of data elements stored on a computer readable medium, determining a first response value to the selected data element value for a first function that is spatially adaptive, determining a first expected response value for the first function from a noise profile that characterizes noise for the first function and determining an output data value for the selected data element for a thresholding function utilizing the first response value and the first expected response value.

Another embodiment of the present invention can include a computer program product comprising a set of computer instructions stored on a computer readable medium and executable by a processor. The set of computer instructions comprising instructions executable to select a data element having a corresponding data element value in a set of data elements stored on a computer readable medium; determine a first response value to the selected data element for a first function; access a first for the first function to determine a first expected response for the first function; and determine an output data value for the selected data element for a thresholding function utilizing the first response value and the first expected response value.

Yet another embodiment of the present invention can comprise a computer program product comprising a set of computer instructions stored on a computer readable medium and executable by a processor. The set of computer instructions can comprise instructions executable to a) perform a wavelet transform on a set of image data to generate a set of coefficients; b) select a coefficient having a corresponding data coefficient value in the set of coefficients; c) determine a set of response values to the selected coefficient value for a set of functions including a spatially adaptive function; d) determine a set of expected response values for the set of functions from one or more noise profiles, wherein each expected response value for a function from the set of functions is determined from a noise profile that characterizes expected responses to noise for that function; and e) determine an output data value for the first coefficient for a thresholding function utilizing the set of response values and the set of expected response values.

Embodiments of the invention provide an advantage over prior art systems and methods of thresholding by providing thresholding that is spatially adaptive within a subband.

Embodiments of the present invention provide another advantage over prior art thresholding systems and methods by providing thresholding that can account for color and tone dependent noise.

The ability to be spatially adaptive and account for color and tone dependent noise further allows embodiments of the present invention to achieve a better balance between noise reduction and signal preservation than is possible using global and subband-adaptive methods.

Embodiments of the present invention can also utilize empirical rather than analytical relationships between the threshold function, coefficient values (or other data element values) and noise. Consequently, embodiments of the present invention can be easily tailored to incorporate edge detectors and other nonlinear functions that are typically not subject to straightforward mathematical analysis and which can be effective at avoiding undesirable de-noising artifacts along edges. Also, the use of empirical measurements tends to yield consistent, aesthetically pleasing results over a wide range of noise distribution and without parameter adjustments.

Embodiments of the present invention provide yet another advantage by being amenable to efficient implementation in computer software or hardware.

BRIEF DESCRIPTION OF THE FIGURES

A more complete understanding of the present invention and the advantages thereof may be acquired by referring to the following description, taken in conjunction with the accompanying drawings in which like reference numbers indicate like features and wherein.

DETAILED DESCRIPTION

Preferred embodiments of the invention are illustrated in the FIGURES, like numerals being used to refer to like and corresponding parts of the various drawings.

Organized data is often used to describe a subject matter of interest. For example, data can be organized to represent stock prices or an image. In the case of an image, data is most commonly organized into pixels, where each pixel contains coordinate values for a color or grayscale space. For instance, in the RGB color space, each pixel in an image contains separate red, green, and blue color values. In the YCrCb color space, each pixel contains a luminance (Y), red-green chroma (Cr), and blue-yellow chroma (Cb) value. Often, when data is collected, noise is introduced into the data. For example, a digital camera can introduce noise into color data.

Embodiments of the present invention provide systems and methods for thresholding values in a set of data for noise removal. According to one embodiment, the noise reduction systems and methods can utilize noise profiles that correlate noise for one parameter based on values for that parameter or other parameters (e.g., can correlate the noise in the Cr color channel to the values of Cr, Cb and Y). Additionally, the noise profiles can characterize noise based on other parameters that may affect noise (e.g., wavelet level, ISO setting on a digital camera or other parameter). Moreover, the thresholding function can be adaptive within a subband. That is, the thresholding function is sensitive to the values of additional coefficients in a subband not just the coefficient to which the function is being applied.

Various embodiments of the present invention provide a system and method for applying thresholds to data from digital imaging devices, such as digital cameras, film scanners, x-ray machines, radar imagining devices and other devices that typically introduce noise in the resulting image. In practice, most digital images exhibit at least a small amount of noise, which is generally due to random or pseudo-random perturbations of pixel values during the image capture process, or resulting from JPEG compression or other processing. In some cases, the noise can be so strong that it represents a significant fraction of average pixel values and detracts from the visual quality of the image. Embodiments of the present invention provide systems and methods to suppress coefficients that are more likely to represent noise in digital image data (and other sets of data).

Figure 1:
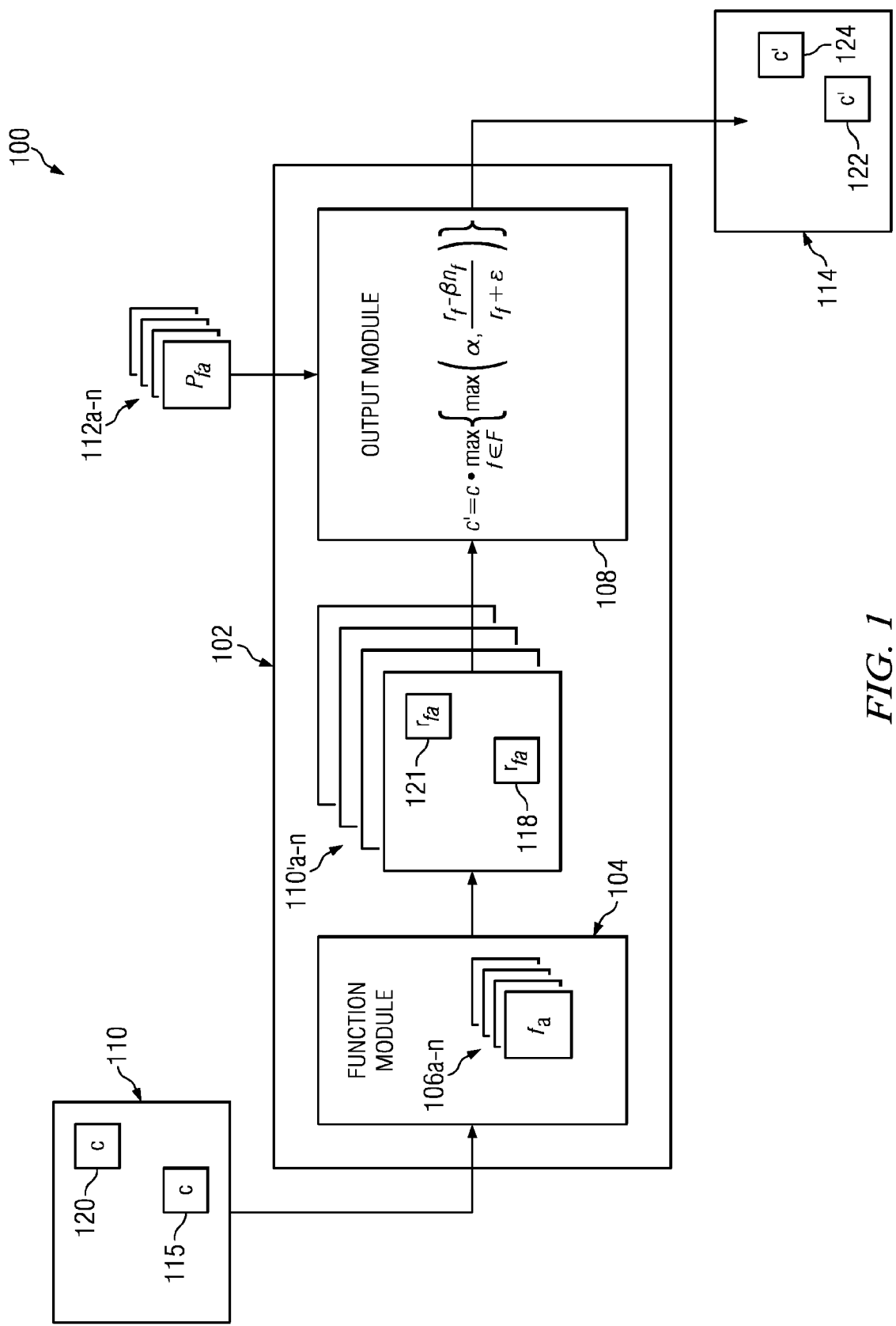
FIG. 1 is a diagrammatic representation of a system for applying thresholds.

FIG. 1 is a diagrammatic representation of one embodiment of functional blocks for a system 100 for applying thresholds to a set of data. The functional blocks of FIG. 1 can be implemented as computer instructions stored on a computer readable medium. Each functional block can be implemented as a software module, function, routine, subroutine, object, as part of a monolithic code set or according to any suitable software architecture programmed in any suitable programming language.

System 100 includes a threshold module 102 that includes a function module 104 that applies various functions ($f_a$ through $f_n$) (indicated at 106a-106n) and an output generator 108. Threshold module 102 takes as an input a set of data 110 that can comprise a number of data elements (e.g., pixel values, coefficients from a wavelet subband or other set of data). As described below, set of data 110 can be the output from a transform operation T, where T is a wavelet transform or other high-pass or band-pass filtering operation. There are a variety of known wavelet transforms, and the set of data 110 can vary depending on T. For instance, in the conventional discrete wavelet transform, each level of the wavelet pyramid has four subbands, corresponding to horizontal, vertical, diagonal, and low-pass filter operations; normally, all but the low-pass subband in each level would be subject to thresholding. As another example, in an "a trous" wavelet decomposition, each level but the lowest normally contains band-pass residual data that is suitable for thresholding. For the purposes of explanation, the data elements in set of data 110 will be referred to as coefficients.

While shown as two-dimensional data, set of data 110 can be one-dimensional data like time series data, two-dimensional data like digital image data, three-dimensional data like medical image data, and data of higher dimensions. The dimensionality of set of data 110 is normally the same as the original signal (i.e. before transformation by T). For instance, if the original signal is a two-dimensional image, then set of data 110 will normally be a two-dimensional array of numeric values.

For purposes of illustration, it is assumed that the coefficients in set of data 110 are scalar values. However, embodiments of the present invention can also be applied to vector-valued coefficients (for instance, residual RGB values from a vector-valued high-pass filter of an RGB color image).

Output generator 108 applies a set of noise profiles 112a-112n in generating an output 114. The noise profiles 112a-112n, as discussed below, can provide the expected response of a function 106a-106n to noise. For example, noise profile 112a can give the expected result of function 106a for a coefficient processed by function 106a if that coefficient represents noise. The noise profiles 112a-112n can characterize noise according to a variety of parameters including, but not limited to, color tuple, digital imaging device (individual device or class of devices), ISO settings or other parameters that can affect noise. Therefore, in addition to set of data 110, other information can be provided as auxiliary information to support some of the operations.

In operation, thresholding module 102 at function module 104 can apply an arbitrary set F of functions $f$ (represented at 106a-106n) to each coefficient c in set of data 110 to generate responses $r_{f_a}$ through $r_{f_n}$ for that coefficient. A function can be a mathematical function or a set of predefined steps to generate a response based on an input coefficient value. For example, the coefficient 115 of can be transformed at 104 by each function $f_a$ through $f_n$ to create an arbitrary number of transformed coefficients (e.g., values $r_{f_a}$ (indicated at 118) through $r_{f_n}$ for coefficient 115). Similarly, functions $f_a$ through $f_n$ can be applied to coefficient 120 to generate $r_{f_a}$ (indicated at 121) through $r_{f_n}$ for coefficient 120. Although shown for only one coefficient, each function $f_a$ through $f_n$ can be applied to each coefficient in set of data 110.

The output of each function can be conceptualized as an output raster of transformed coefficient values. For functions $f_a$ through $f_n$, for example, the output of function module 104 can be conceptualized as transformed input data 110'$_a$ through 110'$_n$. However, transformed input data rasters 110'$_a$ through 110'$_n$ may or may not actually be created, depending on implementation and other data structures can be used to store the $r_{f_a}$ through $r_{f_n}$ values for a coefficient c.

According to one embodiment of the present invention, one or more of the functions $f$ are "feature detector" functions applied to generate $r_f$ values for a coefficient c. Application of feature detector functions is discussed in conjunction with FIG. 2. Other functions can also be applied. For example, an edge detector or other function, including nonlinear functions and functions that incorporate information simultaneously from multiple subbands, color channel or the original image data, can be applied at 104. Other choices are possible for functions applied to the wavelet subbands. For instance, a function that simply returns the square or absolute value of the single coefficient c. Sobel- or Prewitt-style edge detectors are other examples of possible transforms. Yet another example of a transform is the mean absolute deviation or mean square of a neighborhood of pixels about c. A further example is a weighted average of coefficients in a neighborhood, where the weighting for a coefficient is inversely proportional to the absolute difference between a selected coefficient and the center coefficient of the neighborhood. Thus, a variety of transforms can be used to process set of data 110. In any case, for each coefficient c in set of data 110, functions $f$ in F can be applied at the location of c, each function yielding a response value $r_f$. For a raster to which a function is not applied, $r_f$ can simply be the corresponding value of c.

According to one embodiment, a "noise profile" $P_f$ is provided for each function $f$ in F or other transformation applied by the function module 104. Thus, for example, $P_{f_a}$ is a noise profile corresponding to the application of function $f_a$. A noise profile measures the observed response of a feature detector function or other function to a pure noise source that has been transformed using the same operation T that was used to generate input data 110. By way of example, for the feature detector function $f_a$, the noise profile $P_{f_a}$ represents the response of feature detector function $f_a$ to a pure noise source (or approximately pure noise source) given the same wavelet transformation T. The "observed response" of $f_a$ as recorded in profile $P_{f_a}$ can be generated in a number of ways. In one embodiment, $f_a$ is previously applied to multiple noisy samples, and the maximum response is recorded. Other measurements could be used, including standard deviation, absolute deviation, quartiles, or a full probability distribution. Based on these measurements, the noise profile can provide an empirically-based estimate of the response of a feature detector function that could be expected solely due to noise. Thus, noise profile $P_{f_a}$ can provide an empirically-based estimate of the expected response of feature detector function $f_a$ given a pure noise source and a set of parameters (e.g., color, ISO setting or other parameter). Responses above this level can be assumed to include at least some amount of signal. Other methods for developing noise profiles to characterize noise for function $f$ can be utilized. For example, if $f$ is a standard deviation function, the noise profile can be built using absolute deviations and scaled values. For a pure Gaussian noise distribution, this yields the same or similar results as if the noise profile were actually developed using $f$. Thus, while a noise profile may characterize noise for a particular function, it does not necessarily have to be developed using that function.

The noise profile can be implemented in a number of ways, depending on the application. In one embodiment, it can be realized as a lookup table. In addition, the noise profile can account for noise that depends on color, tone, or other attribute of the signals. For example, for digital photographs, it could be embodied as a 3-dimensional lookup table that maps RGB or YCrCb color tuples to feature detector function observed responses for each subband of a wavelet transform. As another example, the observed response can be dependent on the location of a coefficient within set of data 110, as can occur when vignetting correction is applied in a digital camera.

Data for creating noise profiles can be obtained in a number of ways. In one embodiment, the profiles are empirically constructed directly from the input data, using regions or sequences in the data that are identified by the user or by an automated algorithm to contain noise and an approximately constant signal value. In another embodiment, a chart containing a multitude of squares of different colors and tones is photographed using the same or class of camera and settings used to produce set of data 110 or the data that is transformed to yield set of data 110. The patches in the resulting image contain noise and approximately constant signal values, which can be used to construct a noise profile. In this embodiment, the noise profiles can be empirically constructed based on the test image. In yet another embodiment, the profiles are derived analytically, based on known theoretical properties of the camera or other device that produced the noisy input data.

Noise profiles can be constructed uniquely for each image, or they can be constructed once for a particular device and device settings and reused for a multitude of signals produced using the same device and device settings. For instance, in digital photography, profiling a particular camera at each ISO sensitivity setting can yield a set of noise profiles that can be reused for most images taken with the same camera, where the appropriate profile for thresholding any particular image is selected based on the ISO sensitivity setting that was used to produce the image. Alternatively, one "master profile" can be created that accounts for a multitude of parameter and signal dependencies. Embodiments of generating noise profiles are described in U.S. patent application Ser. No. 11/405,797 entitled "Method And System For Characterizing Noise" by Christian, filed Apr. 18, 2006, which is fully incorporated by reference herein.

Output module 108, given a set of input parameters and function $f$ can access the appropriate noise profile $Pf$ to determine the expected result $n_f$ of function $f$ to noise for the given parameters. For example, for function $f_a$, output module 108 can access noise profile 112a (e.g., $P_{f_a}$) to determine the expected response $n_{f_a}$ of $f_a$ given a set of input parameters. Determining the expected response might use auxiliary information about c, such as the color tuple information for the corresponding pixel location in the original digital image, ISO settings or other information. For example, $P_f$ can relate the noise level to color values in the untransformed input data, as would be appropriate for images produced by a digital camera. In this case, the color at c could be estimated either from the pixel corresponding to c in the original noisy image (before it was subjected to the transform operation T), or it could be estimated from an average of neighboring pixels in the original image.

To calculate the output value c' in output data set 114 corresponding to c in data set 110, the response values and pure-noise response values can be combined by a thresholding function. This function can take many forms, though for noise reduction it should result in coefficients being suppressed more aggressively when $r_f$ is similar to or smaller than $n_f$, and it should mostly preserve coefficients when $r_f$ is significantly larger than $n_f$. In a one embodiment, the following thresholding function is used:

$$c' = c \cdot \max_{f \in F} \left\{ \max\left(\alpha, \frac{r_f - \beta n_f}{r_f + \varepsilon}\right) \right\} \qquad \text{[EQN. 1]}$$

In this example, $f$ ranges over F, $r_f$ and $n_f$ are the response values and expected response values defined above, and $\alpha$ and $\beta$ are nonnegative parameters defined below. The constant $\varepsilon$ is added to avoid division by zero (as $r_f$ is assumed to be non-negative in this embodiment); $\varepsilon$ can be a very small positive value such as 1.0E-8. In effect, for this particular embodiment, each feature detector function (or other function) is applied to c, and the one that yields the largest response relative to its expected pure-noise response is used to calculate the value c'. Other embodiments are possible, for example using an average or median of threshold values instead of the maximum. As another example, the threshold function could be based on a higher-order polynomial function of $r_f$ and $n_f$.

The constant $\alpha$ limits the degree to which any coefficient can be suppressed. Positive values result in at least some noise being retained in the output data. For photographs, this is often desirable because the result looks more natural; allowing the noise to be suppressed too aggressively can result in an artificial, "plastic-looking" image for many noise reduction methods.

The constant $\beta$ is a scaling parameter that can be used to control what pixels are classified as noise. Depending on the particular input data and noise characteristics, this can be adjusted to preserve more of the signal, or to classify more coefficients as noise. For instance, if a noise profile records the standard deviation of feature detector responses to pure noise, and the probability distribution of the response function is non-Gaussian, then $\beta$ might need to be adjusted for optimum noise removal results. In one embodiment of the invention, $\alpha$ and $\beta$ are set by the user by adjusting a slider or other mechanism in a user interface. $\alpha$ and $\beta$ can also be set to default values of, for example, 0.5 and 1.0, respectively.

EQN. 1 tends to utilize the largest response relative to noise when determining a value c'. This helps prevent false suppression of image features as if they were noise. However, other thresholding equations can be used.

It can also be noted that the thresholding function of EQN. 1 is locally adaptive in that each coefficient of the set of input data 110 can be suppressed according to a different function $f$ depending on the values of the coefficients. For example, if function $f_a$ yields the strongest response for coefficient 115 (e.g., $(r_{f_a}-\beta n_{f_a})/r_{f_a}$ is the maximum response from a function and is greater than $\alpha$) then coefficient 115 can be processed according to EQN. 1 using the actual and expected response values for $f_a$, whereas if for coefficient 120, function $f_c$ yields the strongest response, coefficient 120 can be processed according to EQN. 1 using the actual and noise response values for $f_c$. In this example, coefficient 122 in output 114 corresponding to coefficient 115 in input 110 is determined based on a different feature detector function than coefficient 124 in output 114 corresponding to coefficient 120 in input 110.

If desired, the feature detectors functions (or other functions) may be configured differently for each image. In an embodiment of the invention, the user can select among several feature detectors. This can be useful, for instance, when a particular feature detector is better at preserving edges while another is better at preserving fine detail, and a particular image is better suited to one or the other functions.

Various embodiments can also be applied to vector-valued data, where the input data (e.g. set of data 110) contains vector-valued coefficients instead of scalar coefficients. For instance, set of data 110 might contain RGB residual values resulting from a vector-valued high-pass filter function applied to an RGB color image. Likewise, the feature detectors can be generalized to have vector-valued responses instead of scalar-valued ones. As an example of a vector-valued feature detector, consider the quadrant detector configuration in the case when set of data 110 contains vector values. The feature detector selected by the feature detector function can be the quadrant with the lowest mean Euclidean or Manhattan distance from the center coefficient. The feature detector response can be the vector mean absolute value of the (vector-valued) coefficients in the selected quadrant. Likewise, the noise profile can record vector-valued observed responses. In addition, the thresholding function can use vector arithmetic, or a combination of vector and scalar arithmetic (for instance, by converting some vector quantities to magnitudes).

Figure 2:
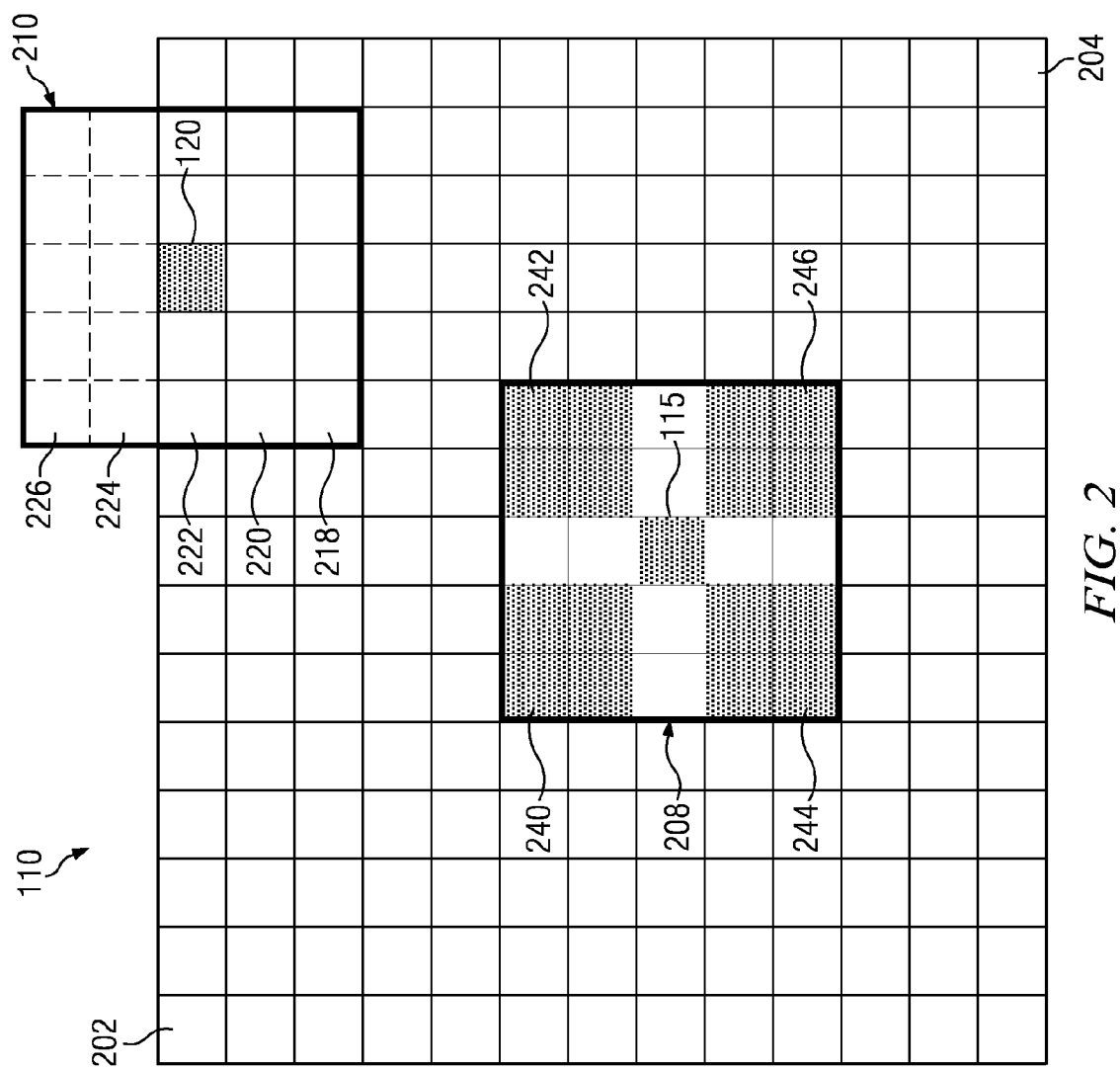
FIG. 2 is a diagrammatic representation of one embodiment of applying a feature detector function.

As described above, function module 104 can apply various functions, including feature detector functions to a set of input data 110. Referring to FIG. 2, a diagrammatic representation of one embodiment of applying a feature detector function. Input data 110 can correspond to image data for digital image 104, a subband raster of digital image (e.g., a high pass subband) or other set of data elements. For the sake of example, it is assumed that array 110 is an array of coefficients c. For simplicity, image detail is not shown in FIG. 2. It is also assumed, for the sake of explanation, K=2, n=1, and the input array contains scalar floating point data elements arranged in h rows and w columns. For the sake of example, c(i, j) denotes the data element (coefficient) at row i and column j of the input array 120, where c(0, 0) is in the upper-left corner of the image (e.g., location 202), and y(h-1,w-1) corresponds to the lower-right corner (e.g., location 204).

For a coefficient (data element), a neighborhood of surrounding coefficients is considered. In a preferred embodiment, an N×N neighborhood of adjacent coefficients is used, typically with N=5 or N=7, though many other choices are possible with respect to size, shape, and spacing of the neighborhood. For example, for coefficient 115, 5×5 neighborhood 208 can be considered while, for coefficient 120, 5×5 neighborhood 210 can be considered. A neighborhood with non-adjacent coefficients can also be used. (e.g., for applications involving multi-scale filtering of data). In a preferred embodiment, N(i, j) is a 5×5 neighborhood of adjacent coefficients centered on c(i, j). However, other choices of N(i, j) are possible, including non-square neighborhoods or neighborhoods where the coefficients are not adjacent. Moreover, the neighborhood can include coefficients from multiple subbands in the same wavelet pyramid and data values from an original signal (e.g., a signal prior to transformation by T if input data is the result of T).

At the edges of set of data 110, reflection or any other appropriate technique can be used to handle the extension of a neighborhood, such as neighborhood 210, past the boundary of the image. For example, indices can reflected when they exceed the bounds of the image. That is, c(i, j)=c(−i, j) if i is negative; c(i, j)=c(h−i−1, j) if i is greater than or equal to h; and similarly for column indices. Other approaches to the boundary cases, for instance by mapping an out-of-bound index to the nearest edge index, can be applied as would be understood by those of ordinary skill in the art. According to other embodiments, trends can be extended. For example, a trend in coefficients 218, 220 and 222 can be extended to coefficients 224 and 226. In yet another embodiment, the values of coefficients 220 and 222 can be reflected in out of bounds coefficients 226 and 224, respectively. The foregoing is provided by way of example, but any suitable technique for handling boundary cases can be used.

Figure 3:
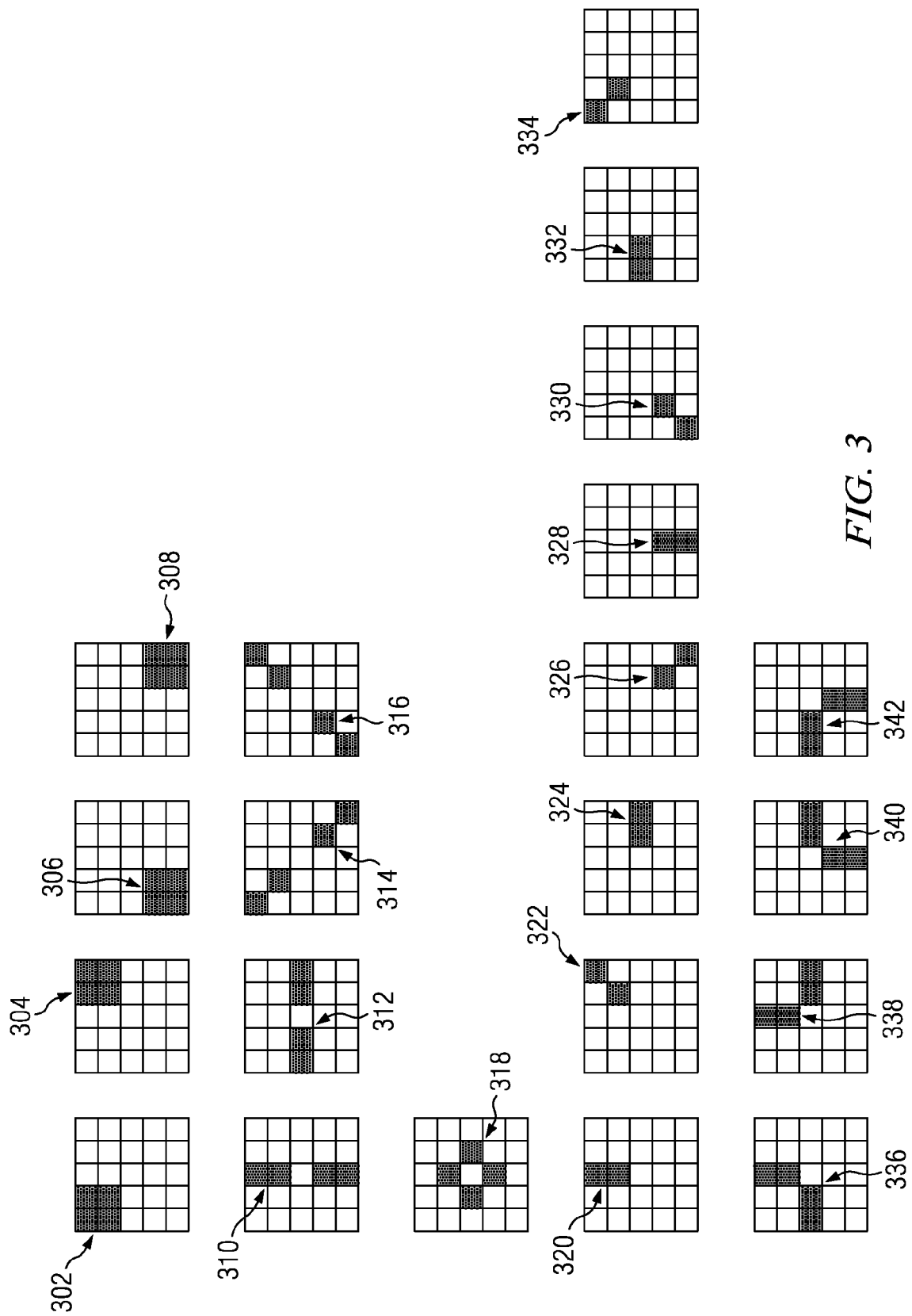
FIG. 3 is a diagrammatic representation of various embodiments of feature detectors.

Within each neighborhood N(i,j), one or more subsets of the coefficients in the neighborhood are considered for a feature detector function $f$. These subsets are referred to herein as "feature detectors". Feature detectors may overlap in coverage. In one configuration, four feature detectors respectively correspond to the upper-left, upper-right, lower-left, and lower-right quadrants of the neighborhood. Many other configurations are possible, including feature subsets corresponding to "spurs" that extend outward from the center coefficient in each of eight compass directions (north, northwest, west, and so forth) and "L-shaped" subsets that extend from the center coefficient at right angles. In addition, configurations of feature detectors can be combined. Turning briefly to FIG. 3, FIG. 3 shows various examples of features detectors for use in a two-dimensional 5×5 neighborhood. Example feature detectors include quadrant feature detectors 302, 304, 306 and 308, spoke feature detectors 310, 312, 314, and 316, a cluster feature detector 318, spur feature detectors 320, 322, 324, 326, 328, 330, 332 and 334 and "L-shaped" feature detectors 336, 338, 340 and 342. Various feature detectors such as the quadrants, spurs and "L-shaped" feature detectors are asymmetric about c(i, j) and optionally do not include c(i, j).

For purposes of explanation, a particular feature detector function (e.g., function $f_a$) performs a function on a coefficient using feature detectors corresponding to the upper-left, upper-right, lower-left, and lower-right quadrants, respectively.

For all pixels in a particular feature detector subset (and optionally including the center pixel if it isn't already included in the subset) a difference measure is calculated based on the value for each coefficient under consideration. In one embodiment, the feature detector function $f_a$ determines the mean absolute deviation of each of the quadrant feature detectors from the coefficient c(i,j) and determines the quadrant feature detector having the lowest mean absolute deviation. For example, returning to FIG. 2, assume quadrant feature detectors in neighborhood 208 are selected (i.e., feature detectors 240, 242, 244 and 246 are applied by $f_a$). $f_a$ can determine which of quadrants 240, 242, 244 and 246 has coefficient values giving the lowest mean absolute deviation from coefficient 115. The quadrant with the lowest mean absolute deviation value of quadrants 240, 242, 244 or 246 can be selected. According to one embodiment, the mean absolute value of coefficients in the selected quadrant can be returned as $r_{f_a}$ for coefficient 115. Thus, the transformed value of coefficient 115 in transformed data set 110'$_a$ of FIG. 1 will be $r_{f_a}$ as determined by $f_a$.

It should be noted that various feature detector functions $f$ can be applied that return a response based on the coefficient values of various feature detectors. A particular feature detector function can utilize any number of feature detectors in generating a response. While the response in the above example is the mean absolute value of a selected quadrant feature detector utilized by the feature detector function $f_a$, other responses can be used. For example, the average or median (or other aggregation) of the coefficient values corresponding to a feature detector can be returned. In other words the average or median value (or other aggregation) of coefficients in a feature detector can be returned as the $r_f$ value for a function $f$.

Figure 4:
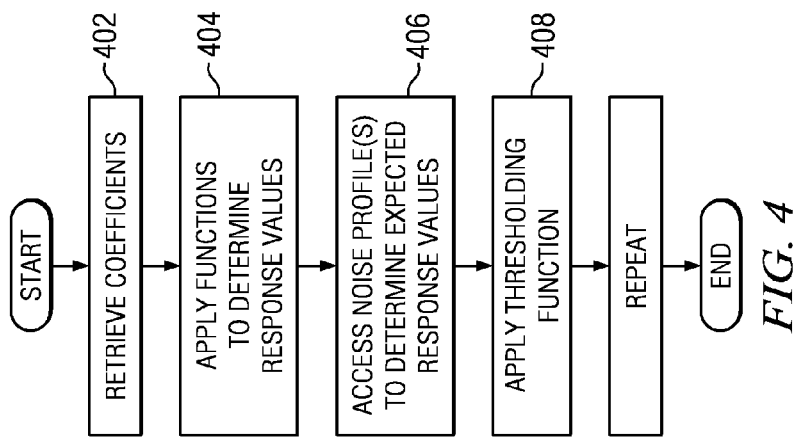
FIG. 4 is a flow chart for one embodiment of a method for applying thresholds.

FIG. 4 is a flow chart for one embodiment of a method for thresholding. The method of FIG. 4 can be implemented as a set of computer instructions stored on a computer readable medium (e.g., RAM, ROM, magnetic disk, optical disk) that are executable by a computer processor.

At step 402 a set of coefficients Ψ can be retrieved. Ψ can be a subband from a transform operation T, where T is a wavelet transform or another high-pass or band-pass operation. The coefficients, according to one embodiment can be values corresponding to various pixels in an image after filtering by T.

At step 404 one or more functions $f$ can be applied to a coefficient c in Ψ to generate a response $r_f$ for each function. The functions can include, by way of example but not limitation, feature detector functions, edge detection functions, edge detector or other function, including nonlinear functions and functions that incorporate information simultaneously from multiple subbands, color channel or the original image data, functions that simply returns the square or absolute value of the single coefficient c in Ψ, Sobel- or Prewitt-style edge detector functions. Yet another example of a function is the mean absolute deviation or mean square of a neighborhood of pixels. A further example is a weighted average of coefficients in a neighborhood, where the weighting for a coefficient is inversely proportional to the absolute difference between a selected coefficient and the center coefficient of the neighborhood. Thus, a variety of functions can be used to process a coefficient c in Ψ.

At step 406, one or more noise profiles are accessed. Typically, each noise profile will correspond to a function $f$ as the noise profile was developed using that function. A noise profile can characterize noise according to a variety of parameters including color channel of Ψ, color information (e.g., color tuple of a pixel corresponding to c or color information derived from other pixel values), wavelet level, imaging device information (e.g., ISO setting, camera type, etc.) For each $f$ applied to c, the expected response to noise $n_f$ can be retrieved from the appropriate noise profile.

At step 408, a value of c' (a value of c after thresholding) can be determined based on the actual responses produced by each function $f$ and the expected response of each function $f$ according to the noise profiles. For example, the value of c' can be determined based on EQN. 1 above.

The steps of FIG. 4 can be repeated for each c in Ψ and for each Ψ produced by T. Additionally, the steps of FIG. 4 can be repeated as needed or desired. Furthermore, the steps can be performed in different orders.

Figure 5:
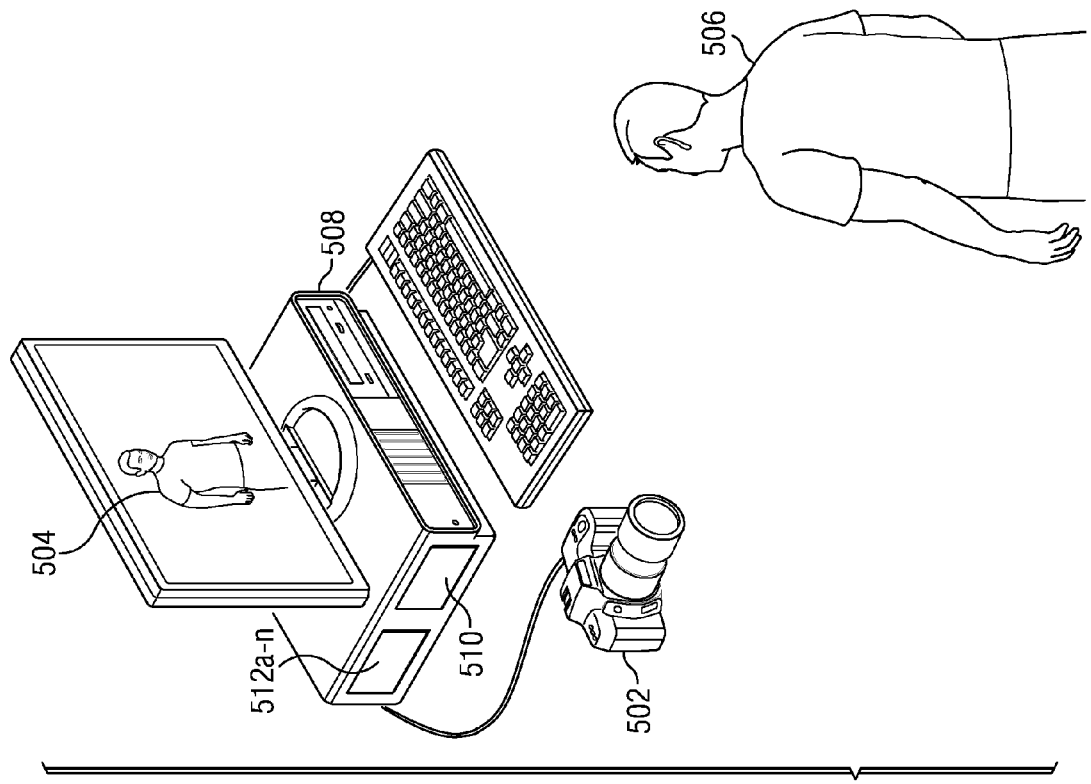
FIG. 5 is a diagrammatic representation of an image processing system.

Embodiments of the present invention can be implemented as part of an image processing system. FIG. 5 is a diagrammatic representation of one embodiment of a system for thresholding for a digital image. According to one embodiment of the present invention, a digital imaging device 502 (e.g., a camera) is used to capture a digital image 504 of a subject matter 506. The digital image can be an image of arbitrary subject matter. Digital image 504 can be taken in the red-green-blue ("RGB") color space, luminance-red-green chroma-blue-yellow chroma ("YCrCb") color space, Lab color space, gray-scale, CMYK color space or other space. The image data is essentially an array of pixel values for the image. Each pixel can have a value for each color channel (e.g., a red value, a green value and a blue value in RGB).

Digital image 504 is provided to an image processing computer 508 that can execute an image processing program 510. Image processing program 510 can display the image to a user through a user interface ("UI") and process the image to reduce, for example, certain data values in or generated from the image data. According to one embodiment, image processing program 510 can utilize noise profiles 512a-n in a thresholding process as described in greater detail below.

Noise profiles 512a-n can be constructed uniquely for the image being processed (e.g., the noise profiles 512a-n can simply be used for processing digital image 504) or the noise profiles can constructed once for a particular device and device settings and reused for a multitude of signals produced using the same device and devices settings (e.g., the noise profiles 512a-n can be used for processing image 504 and subsequent images taken by imaging device 502). For example, noise profiles 512a-n developed for a digital cameral at each ISO sensitivity setting can be reused for images taken with same camera. According to other embodiments, noise profiles 512a-n can be constructed using imaging device 502 and used to process images taken by the same class of imaging device at the same settings (e.g., a noise profile developed for one Canon 10D digital camera at ISO 1600 can be used to process images taken by other CANON 10D digital cameras at ISO 1600) (CANON is a trademark of CANON, U.S.A of Lake Success New York and CANON, Inc. of Tokyo, Japan). One embodiment of constructing noise profiles is described in U.S. patent application Ser. No. 11/405, 797 filed Apr. 18, 2006 by Christian entitled "Method And System For Characterizing Noise", which is hereby fully incorporated by reference herein.

Figure 6:
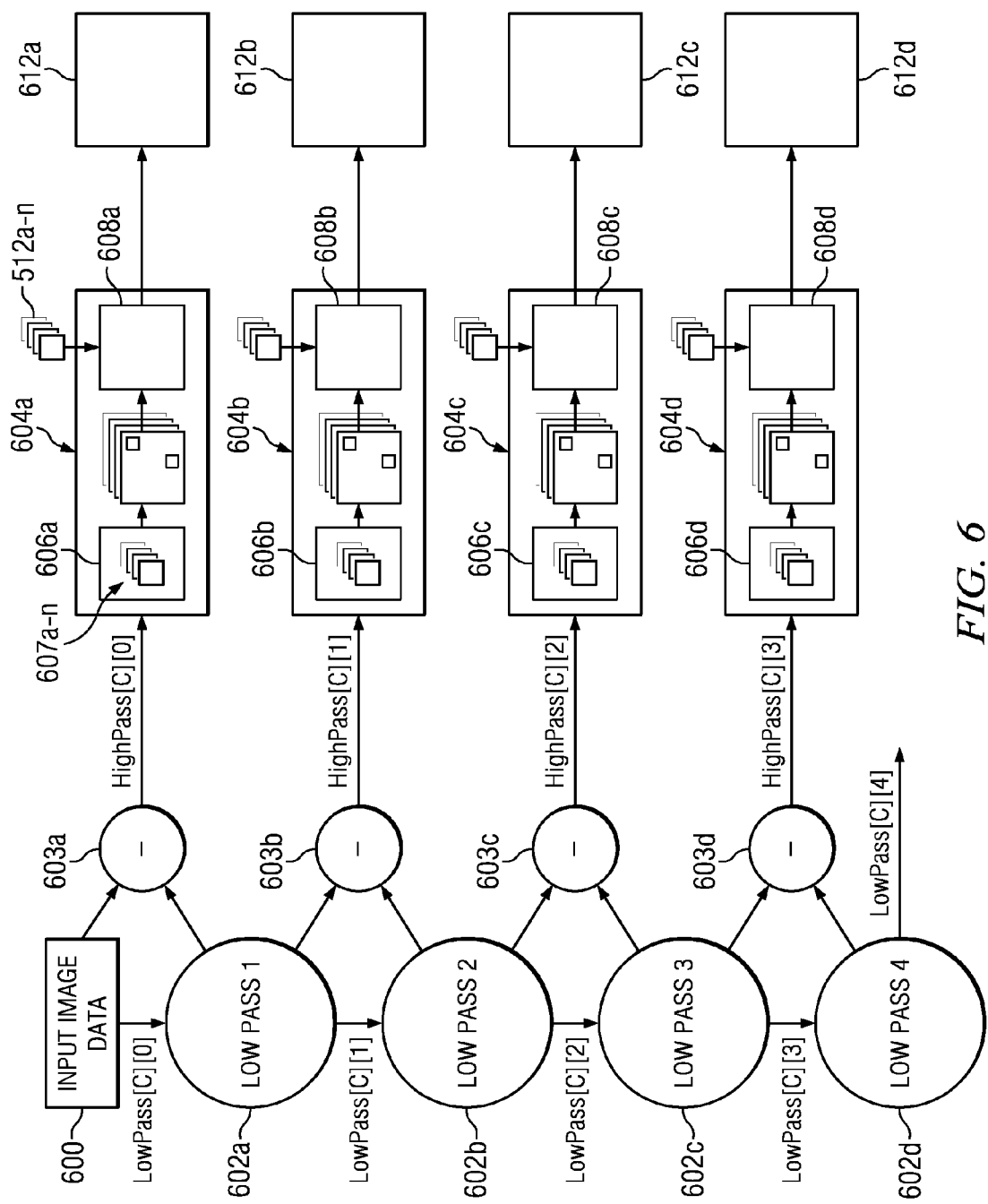
FIG. 6 is a diagrammatic representation of functional blocks for an embodiment image processing.

FIG. 6 is a functional block diagram of one embodiment of processing a set of image data (e.g., corresponding to image 504, a portion of image 504 or other image data). Processing can include application of low pass filters 602a-d, subtractors 603a-d, and thresholding module 604a-d which includes function modules 606a-d and output module 608a-d.

Digital image 504 is optionally converted to the color space used by the noise reduction process that later applies the noise profiles to reduce noise in digital images. For example, if the noise reduction process uses the YCrCb color space, digital image 504 can be converted from RGB to YCrCb so that image data 600 is YCrCb data. Any color space can be used however.

A wavelet transform or other transform is applied to image data 600. There are many wavelet transforms known in the art, including Discrete Wavelet Transform, the "a trous" wavelet transform, shifted transforms, undecimated transforms and other transforms. Example computer source code for a discrete wavelet transform is available in *Numerical Recipes in C*, Second Edition, Cambridge University Press, 1992, pp. 592-595, which is hereby fully incorporated by reference herein. Embodiments of the present invention can use any of these transforms or other suitable transform known in the art.

According to one embodiment, decomposition into wavelet subbands is performed by filtering each color through a set of low pass filters 602a-602d and subtracting the result from the result of the previous filter (if any). It should be noted that while in FIG. 6, four levels of low pass filtering are illustrated, there may be more or fewer levels. Furthermore, the type of low pass filter applied at each level can be different. To perform the a trous decomposition for a region, for example, let Lowpass[C][0] through Lowpass[C][Z] be a set of pixel rasters corresponding to the number of levels Z of the wavelet decomposition for a particular color channel. The pixel values in each raster are generally referred to as coefficients. Each raster includes coefficients for a color channel. Z can be four or can be larger or smaller. Lowpass [C][i] will contain the low pass filtered image data for level i of the wavelet transform for color channel C. For example, in the YCrCb color space, the original image color data can be Lowpass[Y][0]; Lowpass[Cr][0] and Lowpass[Cb][0], and the first level of decomposition image color data can be Lowpass[Y][1]; Lowpass [Cr][1] and Lowpass [Cb][1].

According to one embodiment of the present invention a low-pass filter is applied to each pixel in Lowpass[C][i] to create Lowpass[C][i+1], where, according to one embodiment of the present invention, the distance used for the pixel neighborhood is equal to $2^i$. That is, the pixel located at coordinates (x, y) in Lowpass[C][i+1] is the low-pass filtered version of the pixel located at (x, y) in Lowpass[C][i] and the spacing between neighborhood pixels doubles for each level of the wavelet decomposition. According to other embodiments, the spacing between neighborhood pixels can be more or less.

In a preferred embodiment, the low-pass filter is a homogeneity-based filter or feature-directed predictor-based filter. Examples of homogeneity-based filters and feature-directed predictors are described in U.S. Provisional Patent Application No. 60/692,380, entitled "Homogeneity-Based NonLinear Low-Pass Filter", by Christian, filed Jun. 21, 2005; U.S. patent application Ser. No. 11/472,183, entitled "Homogeneity-Based Low Pass Filter System And Method", by Christian, filed Jun. 21, 2006; U.S. Provisional Patent Application No. 60/692,367, entitled "Low-Pass Filter with Feature-Directed Predictors", by Christian, filed Jun. 21, 2005; U.S. patent application Ser. No. 11/472,169, entitled "Low Pass Filter System And Method", by Christian, filed Jun. 21, 2006;

and U.S. Provisional Patent Application No. 60/692,413, entitled "Method for Removing Noise From Digital Images and Other Signals", by Christian, by filed Jun. 21, 2005, each of which is hereby fully incorporated by reference herein. However, other filters can be used, including the weighted median filter, bilateral filter, anisotropic filter, inverse gradient filter, neighborhood-weighted average or other filter. The parameters of these filters can be determined experimentally, or exposed to the user via controls in noise characterization program 510.

At 603a-603d, Lowpass [C][i+1] can be subtracted from Lowpass[C][i] to create HighPass[C][i] and so on. Thus, in the four wavelet decompositions levels, HighPass[C][0] through HighPass[C][3] are created for each color channel. In an a trous wavelet transform, Lowpass[C][Z] is a residual subband.

Each HighPass[C][i] can be an input into a threshold module 604a. For example, HighPass[C][0] can be the input array into threshold module 604a. Threshold module 604a can process HighPass[C][0] as described above. Function module 606a can apply $f_a$ through $f_n$ functions (indicated at 607a-n) to each coefficient in HighPass[C][0] to generate a corresponding $r_{f_a}$ through $r_{f_n}$ for each coefficient. For each function $f_a$ through $f_n$, output module 608a can access noise profiles 512a-n to determine $n_{f_a}$ through $n_{f_n}$ based on a set of input parameters.

According to one embodiment, each noise profile can be stored in a number of data structures including, but not limited to dense and sparse arrays stored as one or more tables. In one embodiment, the tables represent a w by y by z array, wherein w, y and z represent the number intervals for each color channel. For example, an 8×8×8 cube can be used that overlays the YCrCb color space (e.g., each dimension of the YCrCb space is divided into 8 intervals).

Using the example of an 8×8×8 cube, for each wavelet level i, there can be a lookup table LUT[C,i] for each color channel. Each lookup table can further correspond to a particular function (e.g., feature detector function) and additional parameters. Each table can be mapped by the color coordinates y, cr, and cb in the range 0.0 to 1.0. To map a color tuple (y, cr, cb) to an entry in the table (i.e., a cell located at h, j, k in the table), the indices h=Trunc(y*7.999), j=Trunc(cr*7.999) and k=Trunc(cb*7.999), where Trunc is the truncation function, are calculated. Thus, LUT[C,i](y,cr,cb) denotes the table entry corresponding to an arbitrary color tuple for a color channel and wavelet level.

Using the example above in which $f_a$ is used to generate $r_{f_a}$ for coefficient c(i,j) of HighPass[C][0], the Y, Cr and Cb values for the pixel at (i,j) in the original input raster (e.g., Lowpass[C][0]) can be used to find an entry in table LUT[C, 0], where LUT[C,0] was developed using $f_a$. The entry at LUT[C,0](y,cr,cb) can be the $n_{f_a}$ value. $r_{f_a}$ and $n_{f_a}$ can be used in EQN. 1 for function $f_a$. A similar process can be repeated for each $f$ applied to c(i,j). Output generator 608a can then generate and output array 612a in which coefficients that are more likely to represent noise are suppressed.

It should be noted that while, in the above embodiment, lookup tables are created for each color channel, function and wavelet level, lookup tables can be created to account for other or additional parameters. For example, noise profiles can be developed for each ISO setting of a digital camera. In this case, there can be lookup tables LUT[C,0] through LUT [C,Z-1] for each ISO setting of the digital camera for which a noise profile is developed. The noise profiles can be developed that correspond to an arbitrary number of parameters.

Similar processing can occur at each wavelet level (e.g., by thresholding modules 604b-d having function modules 606b-d and output modules 608b-d) to generate output arrays 612b-d. At each wavelet level different functions f or a different number of functions can be applied.

Thus, embodiments of the present invention provide for thresholding data elements (such as coefficients). According to one embodiment, a number of functions (including feature detector functions) can be applied to a data element to generate responses. Additionally, noise profiles can be consulted to determine an expected result for each function if the data element represents noise. An output value (e.g., after thresholding) for the data element can be generated based on the actual responses of the functions and the expected responses.

Figure 7:
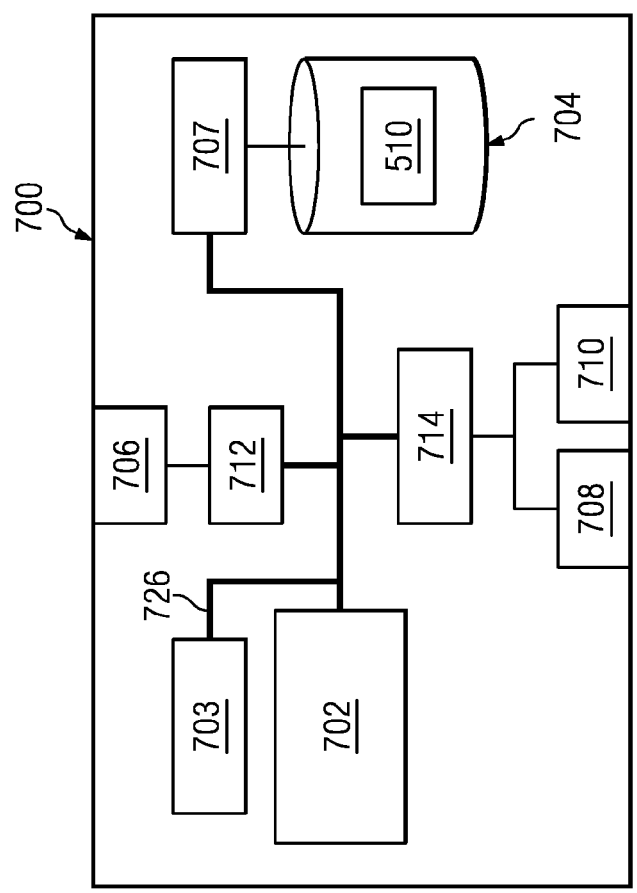
FIG. 7 is a diagrammatic representation of one embodiment of a computer system.

FIG. 7 is a diagrammatic representation of a computer system that can run a noise characterization program ("computer 700"). Computer 700 can include a processor 702, such as an Intel Pentium 4 based processor (Intel and Pentium are trademarks of Intel Corporation of Santa Clara, Calif.), a primary memory 703 (e.g., RAM, ROM, Flash Memory, EEPROM or other computer readable medium known in the art) and a secondary memory 704 (e.g., a hard drive, disk drive, optical drive or other computer readable medium known in the art). A memory controller 707 can control access to secondary memory 704. Computer 700 can include I/O interfaces, such as video interface 706 and I/O interfaces 708 and 710 to connect to other devices. A video controller 712 can control interactions over the video interface 706 and an I/O controller 714 can control interactions over I/O interfaces 708 and 710. Computer 700 can include a variety of input devices. Various components of computer 700 can be connected by a bus 726.

Secondary memory 704 can store a variety of computer instructions that include, for example, an operating system such as a Windows operating system (Windows is a trademark of Redmond, Wash. based Microsoft Corporation) and applications that run on the operating system, along with a variety of data. More particularly, secondary memory 704 can store a software program 510 for image processing (or other data processing as described above). During execution by processor 702, portions of program 510 can be stored in secondary memory 604 and/or primary memory 703.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed in the following claims.

What is claimed is:

1. A method for thresholding comprising:
   loading a set of data element values for a digital image from a computer readable storage medium at a computer configured to process images;
   providing a set of computer code on the computer readable storage medium, the computer code executable to perform a method comprising;
   selecting a data element having a corresponding data element value in the set of data element values stored on the computer readable medium;
   applying a feature detector function to a plurality of feature detectors in a neighborhood about the selected data element, wherein applying the feature detector function comprises:
   determining which feature detector from the plurality of feature detectors in the neighborhood has a lowest measure of difference from the selected data element, wherein each feature detector comprises a different predefined subset of data elements in the neighborhood, wherein the measure of difference is mean absolute deviation;

outputting a response value of the feature detector in the neighborhood with the lowest measure of difference from the selected data element as a first response value for the feature detector function for the selected data element;

determining a first expected response value for the feature detector function from a first noise profile corresponding to the feature detector function, wherein the first noise profile characterizes expected responses for the feature detector function according to a color tuple of a pixel; and determining an output data value for the selected data element for a thresholding function utilizing the first response value and the first expected response value; and outputting the output data value for the selected data element, wherein the output data value c' is generated according to:

$$c' = c \cdot \max_{f \in F}\left\{\max\left(\alpha, \frac{r_f - \beta n_f}{r_f + \varepsilon}\right)\right\}.$$

2. The method of claim 1, wherein the feature detector function determines a mean absolute value of data element values in the feature detector in the neighborhood with the lowest measure of difference from the selected data element.

3. The method of claim 1, wherein the first noise profile characterizes expected responses for the feature detector function according to the color and tone of a pixel.

4. The method of claim 1, wherein the first noise profile characterizes expected responses for the feature detector function based on a subband level of a wavelet decomposition.

5. The method of claim 1, wherein the first noise profile characterizes expected responses for the feature detector function based on one or more parameters that comprise device settings for an imaging device.

6. The method of claim 1, wherein the first noise profile characterizes expected responses for the feature detector function based on color, tone, subband level of a wavelet decomposition and one or more device settings for an imaging device.

7. The method of claim 1, further comprising traversing the set of data elements, using each data element as the selected data element.

8. The method of claim 1, wherein the set of data element values comprise a set of coefficients generated by a wavelet transform.

9. A computer program product comprising a non-transitory computer readable storage medium storing set of computer instructions executable by a processor, the set of computer instructions comprising instructions executable to:

select a data element having a corresponding data element value in a set of data element values stored on a computer readable medium;

apply a feature detector function to a plurality of feature detectors in a neighborhood about the selected data element, wherein applying the feature detector function comprises:

determining which feature detector from the plurality of feature detectors in the neighborhood has a lowest measure of difference from the selected data element, wherein the measure of difference is mean absolute deviation, wherein each feature detector comprises a different predefined subset of data elements in the neighborhood;

outputting a response value of the feature detector in the neighborhood with the lowest measure of difference from the selected data element as a first response value for the feature detector function for the selected data element;

access a first noise profile for the feature detector function to determine a first expected response value for the first function, wherein a first noise profile characterizes expected responses of the feature detector function to noise according to a color tuple of a pixel in an image; and determine an output data value for the selected data element for a thresholding function utilizing the first response value and the first expected response value, wherein the output data value c' is generated according to:

$$c' = c \cdot \max_{f \in F}\left\{\max\left(\alpha, \frac{r_f - \beta n_f}{r_f + \varepsilon}\right)\right\}.$$

10. The computer program product of claim 9, wherein the feature detector function determines a mean absolute value of data element values in the feature detector in the neighborhood with the lowest measure of difference from the selected data element.

11. The computer program product of claim 9, wherein the first noise profile characterizes expected responses of the feature detector function to noise according to the color and tone of a pixel in an image.

12. The computer program product of claim 9, wherein the first noise profile characterizes expected responses of the feature detector function to noise based on a subband level of a wavelet decomposition.

13. The computer program product of claim 9, the first noise profile characterizes expected responses of the feature detector function to noise based on one or more parameters that comprise device settings for an imaging device.

14. The computer program product of claim 9, wherein the first noise profile characterizes expected responses of the feature detector function to noise based on color, tone, subband level of a wavelet decomposition and one or more device settings for an imaging device.

15. The computer program product of claim 9, wherein the computer instructions further comprise instructions executable to traverse a set of data element values using each data element as the first data element.

16. The computer program product of claim 9, wherein the set of data element values comprise a set of coefficients generated by a wavelet transform.

17. A computer program product comprising a non-transitory computer readable storage medium storing set of computer instructions stored, the set of computer instructions comprising instructions executable to:

a) perform a wavelet transform on a set of image data to generate a set of coefficients;

b) select a coefficient having a corresponding coefficient value in the set of coefficients;

c) apply a feature detector function to a plurality of feature detectors in a neighborhood about the selected coefficient, wherein at least one feature detector function determines the lowest mean standard deviation for a set of feature detectors in the neighborhood, wherein applying the feature detector function comprises:

determining which feature detector from the plurality of feature detectors in the neighborhood has a lowest measure of difference from the selected coefficient, wherein the computer instructions are executable to select the lowest mean absolute deviation value as the response value for that feature detector function, wherein each feature detector comprises a different predefined subset of coefficients in the neighborhood;

outputting a response value of the feature detector in the neighborhood with the lowest measure of difference from the selected coefficient as a first response value for the feature detector function for the selected coefficient;

d) determine a set of expected response values for the feature detector function from one or more noise profiles, wherein each expected response value for a feature detector function from the set of functions is determined from a noise profile that characterizes expected responses to noise of that feature detector function, wherein a first noise profile characterizes expected responses of the feature detector function to noise according to a color tuple of a pixel in an image; and e) determine an output data value for the selected coefficient for a thresholding function utilizing the set of response values and the set of expected response values, wherein the output data value c' is generated according to:

$$c' = c \cdot \max_{f \in F} \left\{ \max\left( \alpha, \frac{r_f - \beta n_f}{r_f + \varepsilon} \right) \right\}.$$

18. The computer program product of claim 17, wherein each noise profile of the one or more noise profiles characterizes expected responses of the corresponding feature detector function to noise according to a color and tone of a pixel.

19. The computer program product of claim 17, wherein each noise profile of the one or more noise profiles characterizes expected responses of the corresponding feature detector function to noise based on a subband level of a wavelet decomposition.

20. The computer program product of claim 17, wherein each noise profile of the one or more noise profiles characterizes expected responses of the corresponding feature detector function to noise based on one or more parameters that comprise device settings for an imaging device.

21. The computer program product of claim 17, wherein each noise profile of the one or more noise profiles characterizes expected responses of the corresponding feature detector function to noise based on color, tone, subband level of a wavelet decomposition and one or more device settings for an imaging device.

22. The computer program product of claim 17, further comprising repeating steps b-d using each coefficient in the set of coefficients as the selected coefficient.

23. The method of claim 1, wherein the plurality of feature detectors comprise at least one quadrant feature detector comprising data elements in a corner of the neighborhood.

24. The method of claim 1, wherein the plurality of feature detectors comprise at least one spur feature detector comprising data elements in the neighborhood extending outward from the selected data element.

25. The method of claim 1, wherein the plurality of feature detectors comprises an L-shaped feature detector.

26. The method of claim 1, wherein the plurality of feature detectors comprise feature detectors that are asymmetrical about the selected data element.

27. The method of claim 1, wherein the plurality of feature detectors comprise data elements excluding the selected data element.

* * * * *